United States Patent [19]

Supel et al.

[11] 3,842,328

[45] Oct. 15, 1974

[54] SPEED CONTROL DEVICE WITH INDEPENDENT SPEED CONTROL AND ON-OFF OPERATING MEMBERS

[75] Inventors: Ignacy Supel; Hermann E. Braun, both of Wheeling, Ill.

[73] Assignee: Skil Corporation, Chicago, Ill.

[22] Filed: June 15, 1973

[21] Appl. No.: 370,320

Related U.S. Application Data

[63] Continuation of Ser. No. 230,645, March 1, 1972, abandoned.

[52] U.S. Cl. .................. 318/249, 200/157, 338/198
[51] Int. Cl. ............................................. H02p 5/16
[58] Field of Search ............ 318/345, 249; 200/157; 338/198

[56] References Cited
UNITED STATES PATENTS

| 3,221,192 | 11/1965 | Franklin | 318/345 |
|---|---|---|---|
| 3,260,827 | 7/1966 | Frenzel | 200/157 |
| 3,530,319 | 9/1970 | Larkin | 318/345 |
| 3,546,556 | 12/1970 | Benkert | 318/345 |
| 3,713,070 | 1/1973 | Sahrbacker | 338/198 |

Primary Examiner—Robert K. Schaefer
Assistant Examiner—Thomas Langer
Attorney, Agent, or Firm—McDougall, Hersh & Scott

[57] ABSTRACT

The speed control device includes a casing mounting the components of a speed control circuit having a variable resistor as one component thereof. A first operating member is slidably mounted by the casing and is engaged with the movable element of the variable resistor. A second operating member is slidably mounted by the casing independently of the first operating member; the second operating member controls the on-off contacts and the full speed contacts, the latter permitting the associated tool motor to be energized independently of the speed control circuit.

2 Claims, 18 Drawing Figures

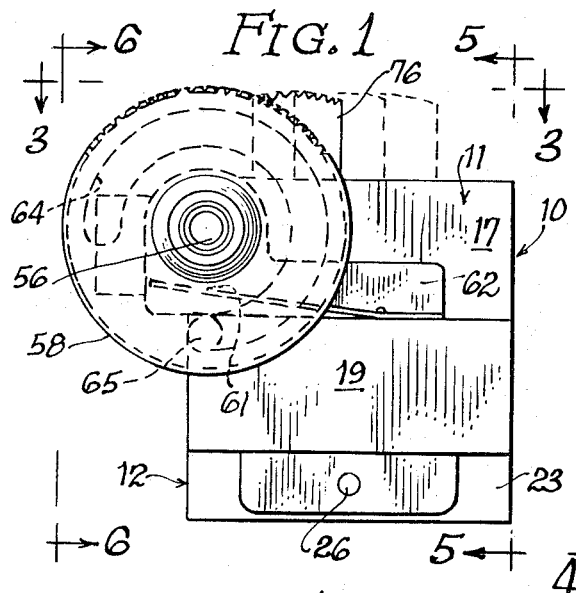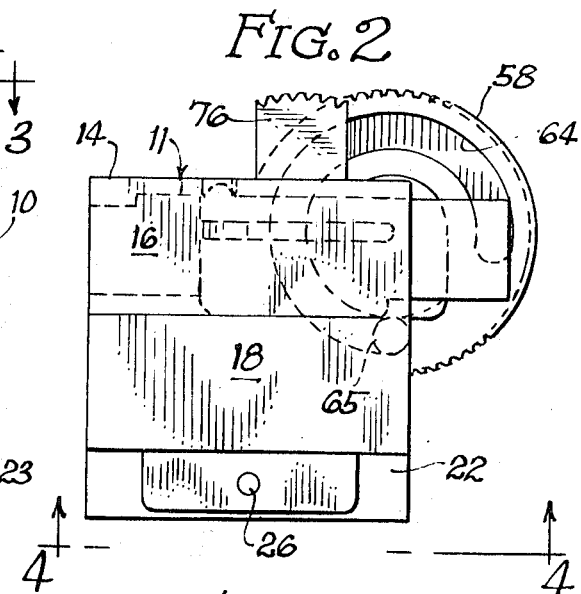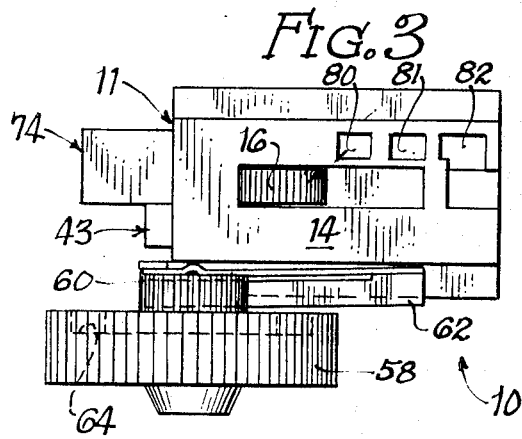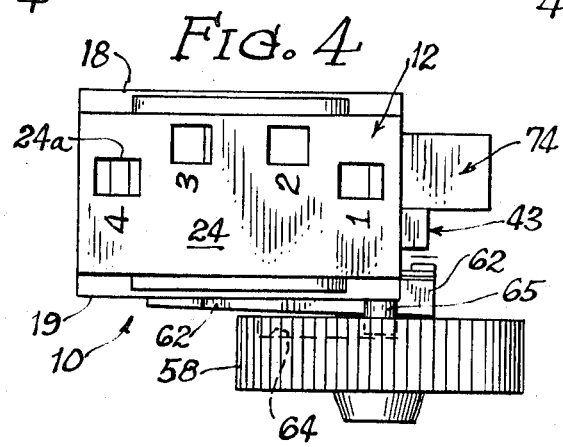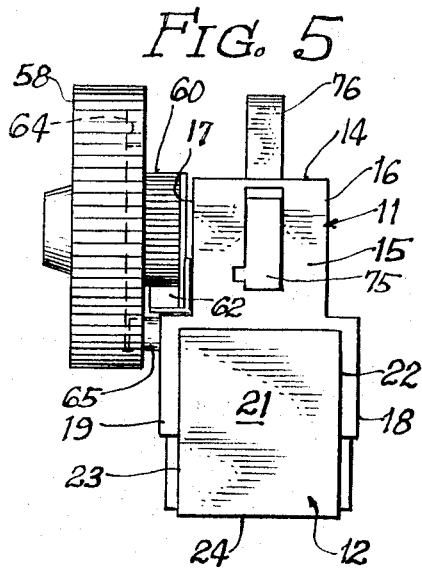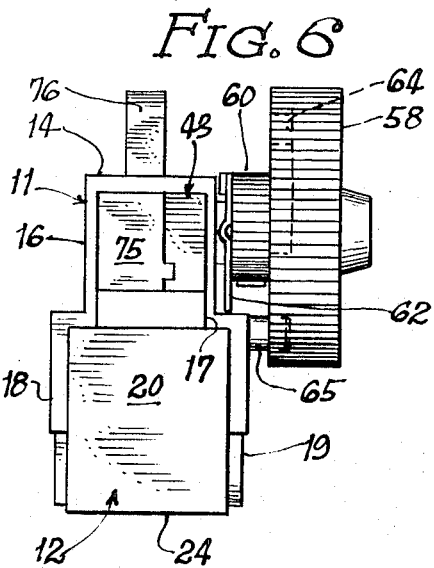

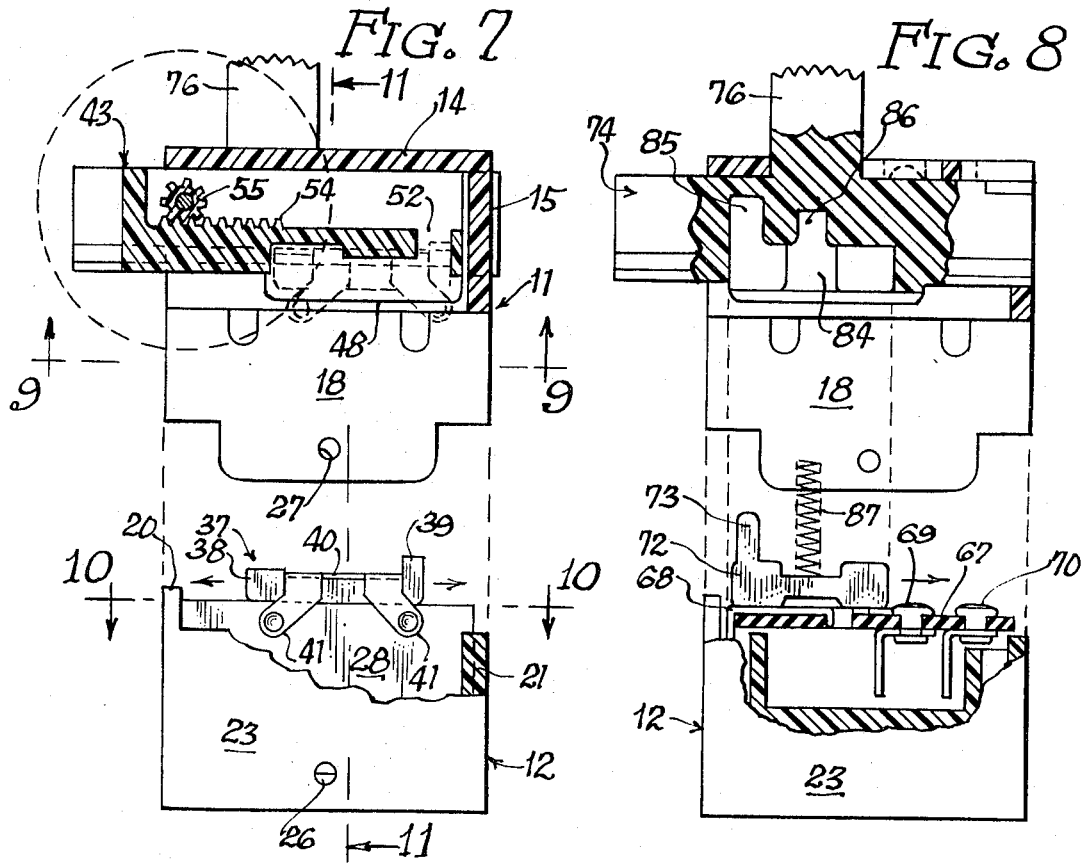
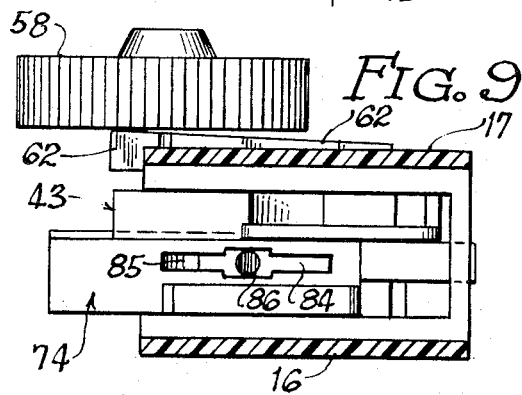
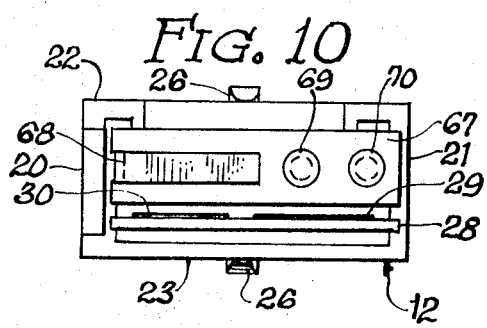
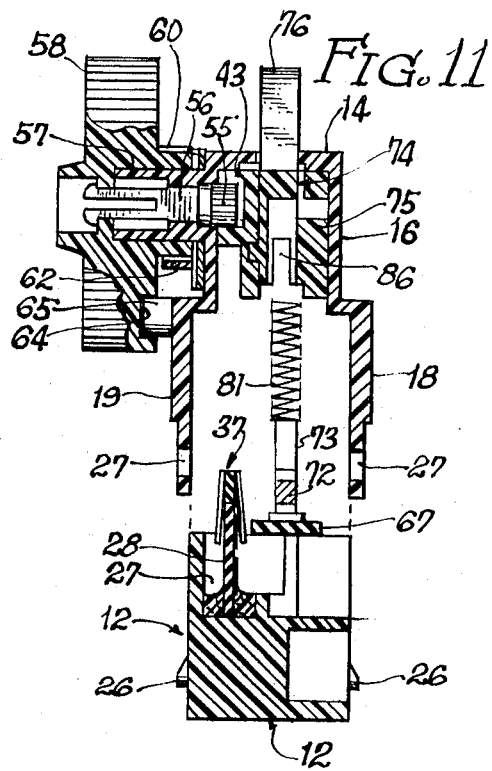

PATENTED OCT 15 1974

SPEED CONTROL DEVICE WITH INDEPENDENT SPEED CONTROL AND ON-OFF OPERATING MEMBERS

This application is a continuation of our application Ser. No. 230,645, filed Mar. 1, 1972 and now abandoned.

BACKGROUND OF THE INVENTION

1. Field of the Invention

The present invention relates to speed control devices for portable electric tools, such as drills and saws, for example. In particular, the present invention relates to such speed control devices which are in the form of a sub-assembly or unit adapted for mounting within the housing of the associated portable tool to control or vary the speed of the tool motor as well as to energize and de-energize such motor.

2. The Prior Art

Speed control devices of the type referred to herein are known in the prior art; see, for example, Gawron U.S. Pat. No. 3,209,228; Frenzel U.S. Pat. No. 3,260,827; Frenzel U.S. Pat. No. 3,594,523; Frenzel Reissue U.S. Pat. No. 26,781; and Robertson U.S. Pat. No. 3,543,120, all assigned to the assignee of the present invention. In the devices shown in each of these patents, a single operating member, the tool trigger, controls the on-off contacts as well as the movable element of the variable resistor. In the operation of tools with such prior art speed control devices mounted therein, the operating member or trigger is depressed first to close the circuit whereupon the motor of the associated tool is energized to operate at its slowest speed. Further depression of the trigger causes the resistance of the variable resistor to be changed thereby to increase the speed of the tool motor. When the trigger of these prior art speed control devices is fully depressed, bypass or full speed switch contacts are brought into play thereby to operate the tool motor at full speed from line current independently of the speed control circuit.

With the use of such speed control devices having a single operating member, it is seen that the tool motor can be operated only according to a predetermined sequence which is as follows in seriatim: first, turning on of the motor; second; increasing the speed of the motor from the lowest speed to the highest speed obtainable by the speed control circuit; and third, full speed operation independently of the speed control circuit. The aforesaid sequence is of course achieved by squeezing the trigger from its fully extended position to its fully depressed position. When the trigger is released, the opposite or reverse sequence of operation of the tool motor is achieved.

In the use of certain portable electric tools, such as saws, for example, it is desirable to be able to control the speed control function independently of operation of the on-off contacts and the bypass or full speed contacts. By way of example, it may be desirable to establish a certain resistance of the variable resistor to provide a selected operating speed and then selectively to energize and de-energize the motor to run at that particular speed and no other speed. Further, in the use of such tools, it is desirable on certain ocaasions to be able to switch to full speed operation from the selected speed in an almost instantaneous manner and without the gradual increase in speed of the tool motor from the selected speed to the highest speed attainable by the speed control circuit.

It is known in the prior art relating to speed control devices of the general type under consideration to provide a control for the variable resistor which is separate from the on-off switch; in this regard, reference is had to Australian Pat. No. 242,179, the complete specification of which was published Oct. 25, 1962. The circuit and switch arrangement according to such Australian patent has a number of disadvantages. One of such disadvantages results from the variable resistor and the on-off switch being provided as completely separate components thereby resulting in complicated and expensive installation of such circuit and components. As a further disadvantage, the variable resistor control and trigger according to the aforesaid Australian patent are in remote or spaced relationship with each other thereby greatly restricting or limiting the manner in which the tool may be operated.

SUMMARY AND OBJECTS OF THE INVENTION

The present invention relates to a speed control device of unitary construction which may be readily and easily mounted within the housing of a portable electric tool, which device has uniquely mounted operating members for independent control of the speed control function and the on-off and full speed functions.

A primary object of the present invention is the provision of a new and improved speed control device with independent speed control and on-off operating members.

A further object of the present invention is the provision of a speed control device of the type just referred to wherein the two operating members are positioned adjacent each other for being readily and easily manually controlled by the tool operator.

Still another object of the present invention is the provision of a new and improved speed control device of the type described wherein separate detent means are provided for the two independent operating members.

Another object of the present invention is the provision of a new and improved speed control device having independent speed control and on-off operating members, whereby the on-off operating member also operates contacts to provide for full speed operation of the associated tool motor independently of the speed control circuit.

These and other objects and advantages of the invention will become apparent from the following specification disclosing a preferred embodiment shown in the accompanying drawings.

Description of the Drawings

FIG. 1 is a side elevation of the speed control device embodying the present invention;

FIG. 2 is a side elevation showing the side of the speed control device opposite the side thereof shown in FIG. 1;

FIG. 3 is a top plan view as seen along the line 3—3 of FIG. 1;

FIG. 4 is a bottom plan view as seen along the line 4—4 of FIG. 2;

FIG. 5 is an end elevation as seen along the line 5—5 of FIG. 1;

FIG. 6 is an end elevation as seen along the line 6—6 of FIG. 1;

FIG. 7 is an exploded vertical section of the speed control device shown in FIG. 1 and primarily illustrating the variable resistor and the operating member therefor;

FIG. 8 is an exploded vertical section taken through the speed control device in FIG. 1 and primarily illustrating the on-off and bypass contacts and the operating member therefor;

FIG. 9 is a section taken along the line 9-9 of FIG. 7;

FIG. 10 is a section taken along the line 10—10 of FIG. 7;

FIG. 11 is a section taken along the line 11—11 of FIG. 7;

DESCRIPTION OF THE PREFERRED EMBODIMENT

Figure 12:
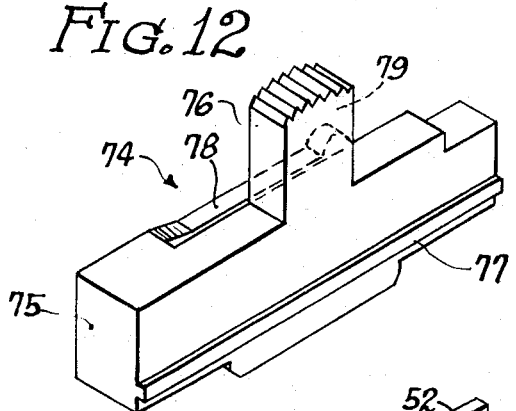
FIGS. 12 and 13 are isometric views of the operating member for the on-off and bypass contacts.
Figure 13:
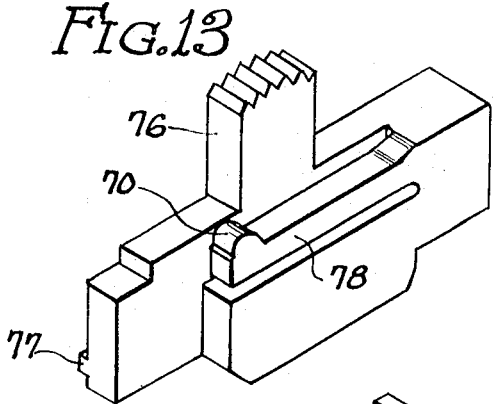
Figure 14:
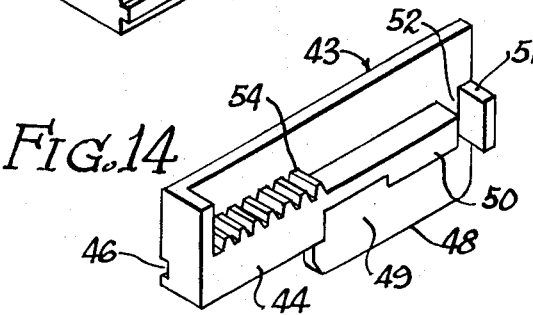
FIGS. 14 and 15 are isometric views of the operating member for the movable element of the variable resistor.
Figure 15:
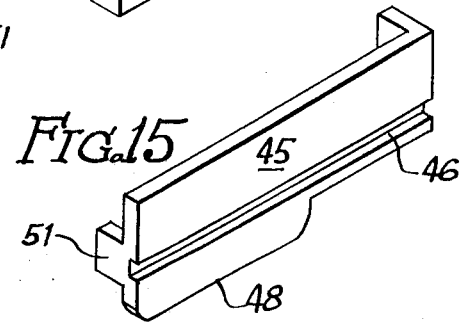

The speed control device of the present invention includes a casing, generally designated 10, consisting of an upper casing member 11 and a lower casing member 12. The upper casing member 11 is of generally inverted U-shape (as seen from front to rear) including a top wall 14, a wall 15 at one end thereof (the upper casing member being open at its other end) and a pair of side walls 16, 17, which side walls have outwardly stepped, depending flange portions 18, 19, respectively.

The lower casing member 12 is generally in the form of a parallelopiped open at the top thereof and including end walls 20, 21, side walls, 22, 23 and a bottom wall 24. The bottom wall is preferably provided with four apertures 24a for reception of push-in terminals of the type known to those skilled in the art. The lower casing member 12 is received within the space defined by the flange portions 18, 19 of the upper casing member 11 — to this end, the side walls 22, 23 of the lower casing member 12 are each provided with a lug 26 adapted to be received within an aperture 27 formed in each of the flange portions 18, 19.

Figure 18:
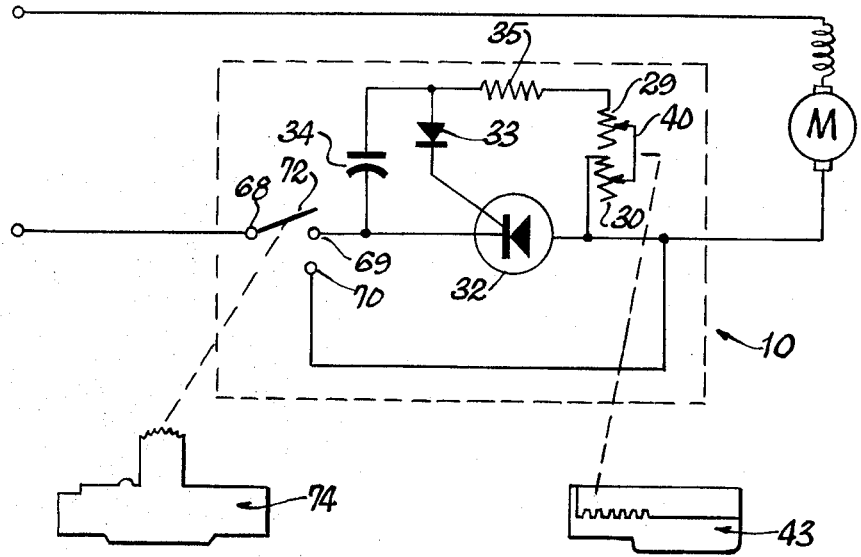
FIG. 18 is an electrical schematic of the speed control device of the invention shown in association with a series or universal electric motor.

The lower casing member 12 includes a cavity or chamber 27 receiving the various components defining a speed control circuit. Preferably, the cavity 27 includes a ceramic circuit board of the type disclosed and claimed in the aforesaid Robertson U.S. Pat. No. 3,543,120. Such circuit board 28 has printed on one side thereof a pair of aligned resistance strips 29, 30 (FIG. 10). Referring momentarily to FIG. 18, it will be understood that such circuit board 28 also has printed or mounted on one side thereof a controllable semiconductor, such as a silicon controlled rectifier 32, the gate of which is connected with a suitable triggering device, such as a diode 33. This same side of the Robertson circuit board mounts a capacitor 34 and a fixed resistor 35, these two components being connected to a common connection which is connected to the diode 33.

Figure 16:
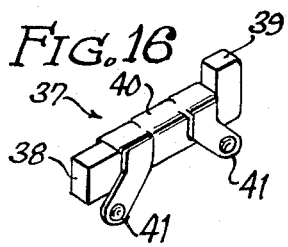
FIG. 16 is an isometric view of the movable element of the variable resistor.
Figure 17:
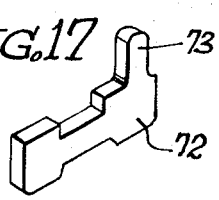
FIG. 17 is an isometric view of the movable contact with is operatively associated with fixed contacts to define the on-off contacts and the bypass contacts.

A variable resistor slider, generally designated 37 (FIG. 16), includes a support bar 38 having an upturned end 39, which bar supports a wiper contact 40, the latter having four depending wiper fingers 41 for slidable engagement with opposite sides of the upper marginal portion of the circuit board 28. It will be understood that two of the wiper fingers 41 which are in coplanar relationship with each other slidably engage respective resistance strips 29, 30 thereby to define a variable resistor.

Reference should be had to the aforementioned Robertson Patent for additional information as concerns the ceramic circuit board mounting the various electronic components defining a speed control circuit. Such circuit is preferably of the non-feedback type as disclosed and claimed in the aforementioned Gawron U.S. Pat. No. 3,209,228.

An elongated operating bar, generally designated 43, is mounted for reciprocal sliding movement in the space defined between the walls 16,17 of the upper casing 11. The operating bar 43 includes a side wall 44 which slidably engages the inside surface of the casing wall 17. The other side of the operating bar 43 is defined by a wall 45 having a longitudinally extending groove 46 the purpose of which will be explained hereinbelow. The operating bar 43 has a depending flange 48 which cooperates with the casing wall 17 to define a pocket 49 for reception of the variable resistor slider 37. The operating bar 43 includes a ledge 50 and an ear 51 defining therebetween a space 52 to receive the upstanding end 39 of the support bar 38 thereby to provide sliding movement of the slider 37 in response to corresponding sliding movement of the operating bar 43.

The ledge 50 includes a series of teeth 54 defining a rectilinear gear track. The teeth 54 are engaged by an annular formation of teeth 55 defining a pinion gear on one end of a shaft 56 (FIG. 11), which shaft is rotatably mounted in an aperture provided in the wall 17 of the upper casing member 11. The shaft 56 mounts a sleeve 57 which in turn mounts an operating disc or wheel 58. It should be apparent that by reason of the engagement between the pinion teeth 55 and the rack teeth 54, rotation imparted to the wheel 58 will result in rectilinear sliding movement of the operating bar 43 in a direction determined by the direction of rotation of the operating wheel 58.

The wheel 58 includes an annular arrangement of detent formations 60 adapted to be engaged one at a time by a detent projection 61 (FIG. 1) formed on a detent spring 62, the latter being suitably supported on the exterior of the upper casing member 11 adjacent the side wall 17. It will be apparent that this detent construction will releasably hold the operating wheel 58 in each of its selected positions.

The operating wheel 58 is preferably provided with an arcuate recess 64 in which a stop pin 65 is received. The pin 65, suitably supported from the flange portion 19 of the upper casing member, is adapted to be alternately abutted by opposite ends of the recess 64 thereby to serve as a stop to limit rotary movement of the operating member 58 so as to prevent jamming and/or damage in the event the operator continues to apply a rotational force to the wheel 58 after the operating bar 43 has reached the limit of its movement as defined by the teeth at the extreme ends of the gear rack 54.

The speed control device of the present invention preferably includes fixed and movable contacts of the type described and claimed in Frenzel U.S. Pat. No. 3,594,523, which contacts define an on-off switch as well as a bypass switch to provide for operation of the tool motor at full speed directly from line current independently of the speed control circuit. According to the aforesaid Frenzel patent, a horizontally disposed dielectric board 67 mounts a contact strip 68, a first contact button 69 and a second contact button 70. A movable contact 72 having an upstanding ear 73 cooperates with the fixed contacts 68, 69, 70 to define the on-off and bypass switches; the manner in which these switches are connected with the speed control circuit can be understood by reference to FIG. 18.

An operating member, generally designated 74, includes an elongated bar portion 75 and an upstanding finger engageable portion 76. The bar portion 75 of this operating member is slidably mounted between the operating bar 43 and the wall 16 of the upper casing member 11. To facilitate the slidable support for both the operating bar 43 and the operating member 74, the latter is provided with a longitudinally extending rib 77 slidably received within the groove 46 of the operating bar 43. The top wall 14 of the upper casing member 11 includes a slot 14a which receives the finger engageable portion 76 of the operating member 74.

The operating member 74 includes an integral spring arm 78 having an upstanding detent formation 79 which is adapted to snap into each of the openings 80, 81 and 82 (FIG. 3). When the detent 79 is received within the opening 80, the operating member 74 occupies the "off" position; when the detent 79 occupies the opening 81, the operating member 74 is in the "on" position. Movement of the operating member 74 until the detent 79 snaps into the opening 82 establishes the "full speed" or bypass position.

The operating member 74 including a cavity 84 (FIG. 8), which cavity includes a recess 85. The cavity 84 loosely receives the movable contact 72 with the upstanding ear 73 thereof being received within the recesss 85. The cavity 84 includes another recess 86 which contains the upper portion of a small coil spring 87. The lower end of this spring engages the movable contact 72 for yieldably urging the same downwardly and into engagement with the fixed contacts.

It should be apparent that reciprocal sliding movement imparted to the operating member 74 results in corresponding sliding movement being imparted to the movable contact 72. The operating member 74 is shown in the "off" position in FIG. 8 in which case the movable contact 72 is in engagement only with the fixed contact 68. When the operating bar 74 is moved to the right (as seen in FIG. 8) to the "on" position, the movable contact 72 is brought into bridging relationship with the contact strip 68 and the contact button 69. As explained more fully in the aforementioned Frenzel U.S. Pat. No. 3,594,523, the movable contact 72 is swung or snapped into engagement with the fixed contact 69 so as to minimize the possibility of arcing and/or pitting of the contacts. When the operating member 74 is again moved to the right for establishing the "full speed" position, the movable contact 72 will establish a bridging relationship between the contact strip 68 and the contact button 70; in this position, the movable contact 72 does not engage the contact button 69.

As best noted in FIG. 11, the wheel 58 is in adjacent relationship with the upstanding portion 76 of the operating member 74 thereby permitting the operator of a tool embodying the speed control device of the present invention to use a single finger for controlling the speed control function as well as the on-off and full speed modes of operation. The wheel 58, or the adjacent portion of the housing of the speed control device 10, or the adjacent portion of the housing of the associated tool is preferably provided with indicia to indicate the direction in which the wheel 58 is to be rotated to increase and decrease the speed of the tool motor. Preferably, suitable indicia is also provided adjacent the finger engageable portion 76 of the operating member 74 to indicate the "off," "on," and "full speed" positions.

It will be appreciated that, by reason of the independent operation of the wheel 58, which controls the speed control function, and the operating member 74, which controls both the on-off function and the full speed mode of operation, the operator of a tool embodying the speed control device of the present invention has considerable freedom in the manner in which he operates the tool. When the operating member 74 is moved to the "on" position, the tool motor will be energized and will run at the speed established by the position of the operating bar 43 which is in turn controlled by the wheel 58. The separate detent means provided for both the wheel 58 and the operating member 74 serves to hold each of these members in its selected position. With the operating member 74 in the "on" position, the wheel 58 may be rotated in either direction to increase or decrease the speed as desired. Should the operator desire to achieve full speed at any time, the operating member 74 is moved to the "full speed" position as described above whereupon the speed control circuit will be bypassed and the tool motor will run at full speed directly from line current. It is appreciated that in switching to such full speed operation, it is not necessary to move the wheel 58 and gradually increase the speed from the selected speed.

When it is no longer desired to operate the tool at full speed, the operating member 74 may be returned to the "on" position whereupon the motor will again be energized to run at the speed previously established by the wheel 58. When it is desired to de-energize the tool motor, the operating member 74 alone is actuated thereby providing for instantaneous de-energization. Since the wheel 58 need not be actuated when de-energizing the tool motor, the speed control circuit will remain in condition to operate at the previously selected speed when the operating member 74 is again moved to the "on" position. The speed control device of the present invention permits the associated tool to be repeatedly energized to operate at a speed selected by the wheel 58.

We claim:

1. In a speed control device for a portable electric tool or the like, the improvement comprising:
   a. a casing adapted to be operatively mounted within such power tool or the like;
   b. means within said casing defining a speed control circuit of the type which includes a linear variable resistor and an associated movable element whereby the speed of the tool motor may be varied in response to changes in the resistance of said variable resistor resulting from movement of said element;

c. a manually operable, elongated, speed control member mounted by said casing for reciprocal sliding movement and engaged with said movable element of said variable resistor for moving the latter in response to movement of said member;

d. on-off switch means including a movable contact associated with said circuit for opening and closing the same;

e. a manually operable, on-off, elongated control member mounted by said casing adjacent said speed control member for reciprocal sliding movement along a path parallel with the path of movement of the latter, said on-off control member being engaged with said movable contact for operating said on-off contacts in response to movement of said on-off control member, said speed control member and said on-off control member being slidably engaged with each other for independent sliding movement;

f. said speed control member including a series of gear teeth forming a rack;

g. said casing mounting a pinion gear engaged with said rack; and h. a manually operable wheel engaged with said pinion gear thereby to impart reciprocal movement to said speed control member in response to rotation of said wheel.

2. The improvement according to claim 1 further defined by:

a. a fixed contact mounted so as to be engaged by said movable contact when said on-off control member is moved to a "full speed" position; and b. further circuit means including said fixed contact and said movable contact for operating the associated motor independently of said speed control circuit when said on-off control member is moved to said "full speed" position.

* * * * *